J. H. FLORIAN.
WINDOW CAGE.
APPLICATION FILED JULY 10, 1916.

1,239,472.

Patented Sept. 11, 1917.

INVENTOR
J. H. Florian,
by
Owen, Owen & Crompton.

UNITED STATES PATENT OFFICE.

JOSEPH H. FLORIAN, OF TOLEDO, OHIO.

WINDOW-CAGE.

1,239,472. Specification of Letters Patent. Patented Sept. 11, 1917.

Application filed July 10, 1916. Serial No. 108,491.

*To all whom it may concern:*

Be it known that I, JOSEPH H. FLORIAN, a citizen of the United States, and a resident of Toledo, in the county of Lucas and State of Ohio, have invented a certain new and useful Window-Cage; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to window cages. It has for its object to provide a window cage or seat which may be used to stand or kneel upon while washing the exterior of window panes, which may be readily placed in position for use, and is provided with means for cushioning the parts of the cage to prevent marring of the window casing and the outside of the building and is formed of standard pipe fittings and parts.

The invention may be contained in constructions of different forms. I have selected one of such constructions as an example to show the practicability of the invention and will describe it hereinafter. The structure selected is illustrated in the accompanying drawings.

Figure 1:
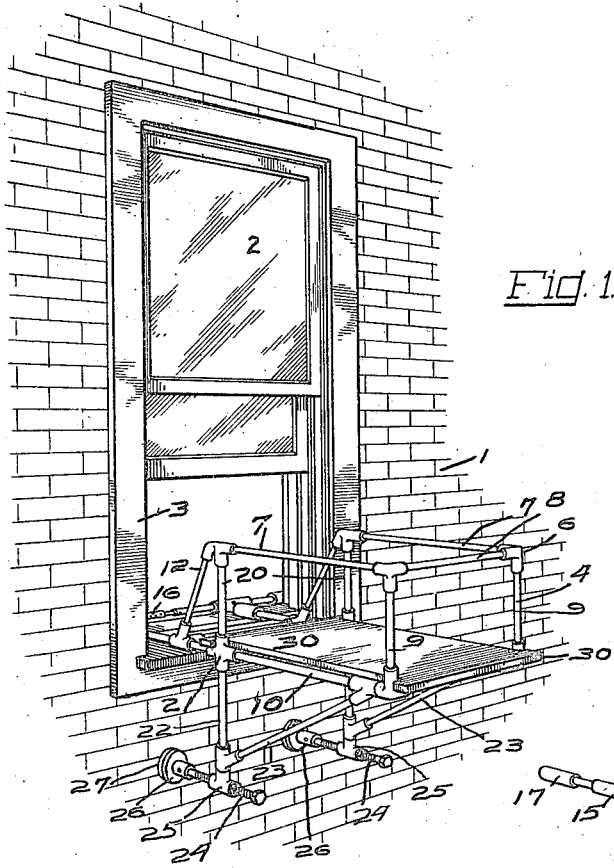
Figure 3:
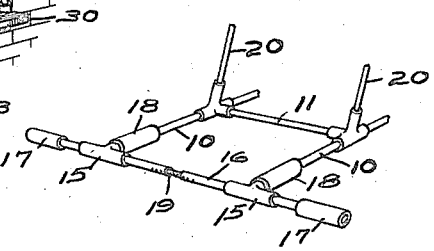
Figure 2:
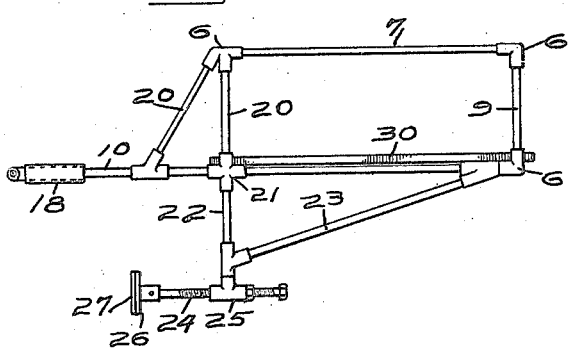

Figure 1 of the drawing illustrates the window cage applied to the window. Fig. 2 is a side view of the cage and Fig. 3 is a perspective view of a part of the cage.

1, Fig. 1, is the wall of the building, in which is located the window 2. 3 is the window frame containing the sashes. 4 is the cage which may be passed to the exterior of the building through the frame when one of the window sashes has been raised.

The window cage 4 consists of a frame formed of standard pipes and pipe fittings. The frame consists of two upper side pipes 7, a rear pipe 8, upright pipes 9, and also lower horizontal pipes 10, similar in relation to the upper pipes except that two of the horizontal pipes 10 are longer than the parallel upper pipes 7, which are secured together by the elbow T pipe fittings 6. The two pipes extend within the window frame 3 when the cage is in position in the window. The pipes 10 are tied together by horizontal pipes 11 and double T's, each having an inclined part for connection with inclined braces. Two bracing pipes 12 connect the upper corners of the frame which have angled T's to the horizontal pipes 10 and thus securely brace the upper part of the frame so that if desired anyone can stand upon the pipes 7 while working on the window. The ends of the pipes 10 are provided with T-pipe fittings 15, in which is slidably located a telescoping rod or pipe 16 having a length sufficient to extend across the vertical parts of the window frame 3. The ends of the telescoping pipe 16 are provided with short rubber or canvas tubes or pipes 17 which rest against the inside of the window frame 3 to prevent marring the window frame. Also, the horizontal pipes 10 are provided with short pieces of rubber 18 for cushioning the frame against the sill of the window. The telescoping pipe 16 may be adjusted so as to bring the cushioning part 17 against the frame, and it may thus be set to windows of different widths. Also, if desired, the pipe 16 may be removed from the frame. The pipe 16 may be formed of two parts connected together by a suitable rod 19, which telescopes into the pipe, the pipes and rods having registrable holes into which pins may be inserted for securing the parts of the pipe 16 in their relative positions.

The cage is also provided with vertical pipes 20 which may be fitted to cross pipe T fittings 21 and continue vertically downward in the pipes 22, which are braced by the braces 23, which connect the lower ends of the pipes 22 to the outer corners of the cage through branch and angle T's. Bolts 24 may extend through pipe fittings 25 located at the lower end of the pipes 22. The inner ends of the bolts may be provided with suitable plates 26 which form pressure feet for the cage against the wall of the building. The plates 26 may be provided with cushions of rubber 27 which will cushion the cage against the wall of the building. The bolts 24 may be adjusted according to the thickness of the wall of the building and to bring the rods 7 and 10 in horizontal position. A platform or board 30 may be supported on the horizontal rods 10.

In the use of the instrument the bolts 24 may be set so as to bring the plates 26 to any desired relative position and the cage may be inserted through the window and the cross pipe 16 may be adjusted so as to permit the cushioned ends of the pipe to rest upon the inside frame of the window. The cage will thus be supported in position. The user of the cage may then sit upon or stand upon the platform 30 and clean the outside of the window.

The construction described may be modified by those skilled in the art, and yet such modification may still contain the invention.

Having thus described my invention, what I claim as new, and desire to secure by Letters Patent, is—

In a window cage formed of standard pipe fittings, the combination of a platform frame having upper and lower parallel pipes and upright pipes forming three sides of the cage and connected together by elbow T's, the upright pipes and horizontal pipes braced by pipes extending from the corners of the frame to the lower horizontal pipes and connected by angle T's, two of the lower horizontal pipes having cushioned members and extending within the window frame, T's located on the ends of the horizontal pipes extending within the window frame, a transverse telescoping pipe extending through the last named T's and having cushioned ends, two of the vertical members of the platform frame having extensions, the extensions having braces formed of pipes extended to the outer and lower corners of the frame, threaded T's connected to the ends of the extensions, the threaded bolts extending through the threaded T's, the bolts having feet for resting against the wall of the building below the window frame.

In testimony whereof, I have hereunto signed my name to this specification.

JOSEPH H. FLORIAN.

Copies of this patent may be obtained for five cents each, by addressing the "Commissioner of Patents. Washington, D. C."